No. 741,890. PATENTED OCT. 20, 1903.
H. CRAIGIE.
DENTAL DAM.
APPLICATION FILED JUNE 15, 1903.
NO MODEL.

Witnesses,
Inventor,
Henry Craigie
By Geo. H. Strong.
atty

No. 741,890. Patented October 20, 1903.

UNITED STATES PATENT OFFICE.

HENRY CRAIGIE, OF SAN FRANCISCO, CALIFORNIA, ASSIGNOR OF ONE-HALF TO JOHN W. ROOCH, OF SAN FRANCISCO, CALIFORNIA.

DENTAL DAM.

SPECIFICATION forming part of Letters Patent No. 741,890, dated October 20, 1903.

Application filed June 15, 1903. Serial No. 161,556. (No model.)

*To all whom it may concern:*

Be it known that I, HENRY CRAIGIE, a citizen of the United States, residing in the city and county of San Francisco, State of California, have invented an Improvement in Dental Dams; and I hereby declare the following to be a full, clear, and exact description of the same.

My invention relates to improvements in dentistry, and particularly in rubber dams.

It consists of the parts and the construction and combination of parts as hereinafter more fully described, having reference to the accompanying drawings, in which—

Figure 1:
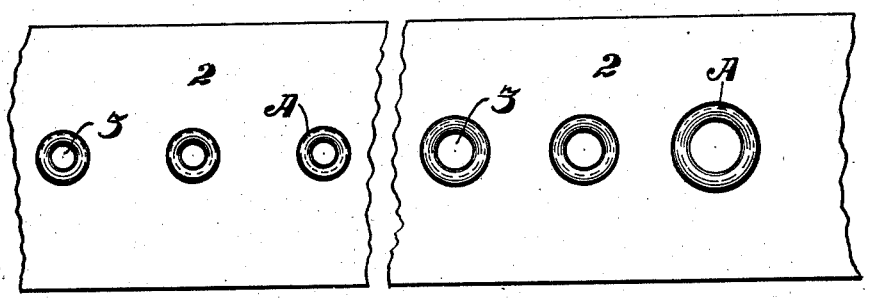
Figure 2:
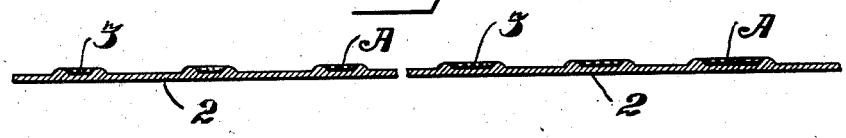
Figure 3:
Figure 4:
Figure 5:

Figure 1 is a plan view of my invention. Fig. 2 is a section of same. Fig. 3 is a sectional view of a modification. Fig. 4 is a sectional view of another modification. Fig. 5 shows the application of the invention to a tooth.

It is usual to take a thin sheet of rubber perforated at intervals and force it around a tooth to exclude the saliva from the cavity under treatment. In order to keep this rubber sheet or dam in position, it is common to employ steel clamps, which grip over the teeth and press the rubber down under the free margin of the sensitive gum. The pressure of these clamps is often very painful. Moreover, the movements of the patient and the actions of the muscles of the face often cause the ordinary dam, which is of uniform thickness throughout, to be pulled away from the tooth and allow moisture to penetrate to the cavity.

My invention consists, essentially, of a series of annular ridges or projections A above the surface of and integral with the dam-sheet 2. These projections are disposed at suitable intervals corresponding to the teeth over which the dam is to be fitted. The projections may be round, oval, square, or any other suitable configuration, and the space 3 inclosed may be perforated at the time the dam is manufactured, or the perforations may be made in the usual manner by the dentist prior to fitting the dam in position in the patient's mouth.

A reinforcement instead of being ring-shaped may be in the form of a convexed protuberance adapted to be centrally perforated, as indicated in Fig. 3. The walls of the perforations may be vertical or inclined. They are preferably inclined, because the tendency of the beveled edge is for it to work well in between the contracted portion of the tooth and the gum.

By means of the reinforcing-annulus the dam is strengthened where strength is most needed, and it is made to grip more firm around the neck of the tooth, so that the thinner body portion and outer edges of the dam may be moved or stretched without interfering with the part in contact with the tooth to let moisture enter the cavity. Furthermore, and what is of great importance, the embrace on the tooth is so snug and rigid that metal clamps are unnecessary.

Having thus described my invention, what I claim, and desire to secure by Letters Patent, is—

1. As a new article of manufacture, a rubber dam having integral perforated embosses.

2. As a new article of manufacture, a perforated rubber dam having a reinforced ledge surrounding each perforation, said ledges integral with the dam-sheet and of material homogeneous with said sheet.

3. As a new article of manufacture, a perforated rubber dam having annular embosses upon its surface surrounding the perforations, the walls of said perforations being beveled substantially as and for the purpose described.

In witness whereof I have hereunto set my hand.

HENRY CRAIGIE.

Witnesses:
S. H. NOURSE,
D. B. RICHARDS.